Jan. 10, 1950     S. H. WHITE     2,494,219
GASEOUS FUEL MIXTURE
Filed Aug. 15, 1946

Samuel H. White, Inventor

By [signature]

Attorney

Patented Jan. 10, 1950

2,494,219

UNITED STATES PATENT OFFICE 2,494,219

GASEOUS FUEL MIXTURE

Samuel H. White, Detroit, Mich.

Application August 15, 1946, Serial No. 690,819

7 Claims. (Cl. 62—1)

This invention relates to means for the production of a fuel gas for use in metal operations, such as welding, cutting and the like, and is more particularly directed to a gas producing means for the automatic mixing of a volatile fluid and a volatile chemical in substantially uniform proportions within a range of 82 to 89% of the vapor of the volatile fluid and 11 to 18% of the vapor of the volatile chemical.

In compounding gaseous fuels of the type referred to, it is desired or necessary to have a uniform mixture of the vapor of the volatile liquid and the vapor of a hydrocarbon chemical. Normally, however, the volatile liquid and hydrocarbon chemicals will not remain mixed in storage, as the hydrocarbon chemicals, incident to their relative specific gravity, will settle to the bottom. In the absence of provision to counteract this condition the hydrocarbon chemical will, largely, if not entirely, remain in the bottom of the storage cylinder and the fuel, as delivered for use from the cylinder, will lack the important characteristics of the hydrocarbon chemical.

The present invention is particularly directed to means for mixing the vapor of the volatile liquid and the vapor of the hydrocarbon chemicals during delivery of the fuel for use and, further, for mixing these vapors within a substantially uniform range of selected proportions as long as the fuel remains under pressure in the cylinder.

The invention contemplates the provision of a pick-up tube by which the chemical is directed to a mixing chamber and a very small opening in the tube for admitting vapor of the volatile liquid, this opening serving to effect the mingling of a high velocity fine stream of vapor under pressure and the chemical stream, to vaporize the chemical before its supply to the mixing chamber. The mixing chamber is provided with admission passages from the pickup tube and the vapor area of the storage cylinder for delivering substantially uniform proportions of the vapor of the volatile liquid and the vapor of the chemicals to the mixing chamber. The mixing chamber is, preferably, of a form to permit the expansion of the vapors to effect a complete mixing and equalization of the pressures of the respective vapors.

The invention is illustrated in the accompanying drawings in which.

In the drawings.

Figure 1:
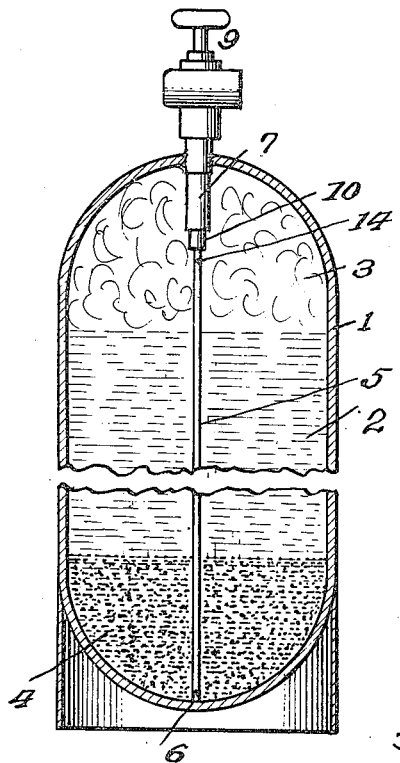
Figure 1 is a sectional view of a cylinder, the volatile liquid and hydrocarbon chemical being indicated and the automatic control element being shown in elevation.

Referring to the drawings, specifically to Fig. 1, a more or less conventional type of storage cylinder 1 is adapted to contain the usual volatile fluids which are introduced into the cylinder in liquid form and therefore under pressure. The volatile liquid vaporizes within the cylinder presenting a body 2 of the volatile liquid and an upper volume or area 3 of vaporized liquid. As a tendency of the volatile liquid to vaporize will continue until the pressure of the vapor area 3 is sufficient to prevent further vaporization of the body of the liquid until such vapor pressure has been relieved, it will be apparent that the volatile liquid remains in the cylinder under pressure which is constantly maintained while the cylinder is closed or while the material is being withdrawn from the cylinder for use.

In order to provide for the enrichment and a more effective operation of the fuel, it is customary to vaporize one or more selected hydrocarbon chemicals and mix this vapor with the volatile liquid vapor to provide a fuel of greater efficiency and reduced cost. It is necessary, however, to prepare the ultimate fuel in substantially uniform proportions of the volatile liquid and hydrocarbon chemical or chemicals best suited to efficiently and economically carry out the work for which the fuel is to be utilized in the particular job.

It has been previously attempted to mix this chemical or chemicals with the vapor of the volatile liquid and maintain such as a mixture in the cylinder, but all such known attempts have failed for the primary reason that the chemicals have a specific gravity greater than that of the volatile liquid, and will settle and collect in a body 4 at the bottom of the cylinder 1. It is not only important that an effective mixture be delivered for use but that the materials of that mixture be maintained within a reasonably definite proportion range in such mixing.

Figure 2:
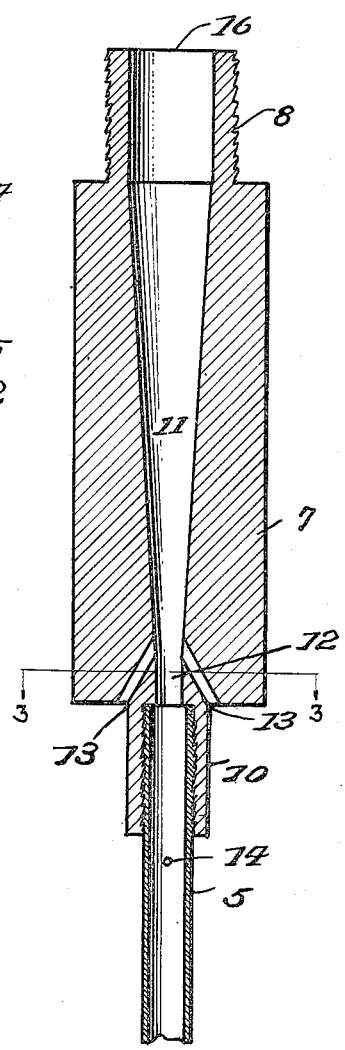
Figure 2 is an enlarged section of the automatic control and mixing element.
Figure 3:
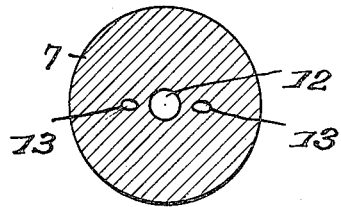
Figure 3 is a section along line 3—3 of Figure 2.

The cylinder 1 is, for the purpose of the present invention, provided with a tube 5, hereinafter termed a pick-up tube, which extends to the bottom of the cylinder and is open at its lower end 6 to the chemical 4. The pick-up tube extends upwardly in the cylinder and terminates in a mixing unit 7 best shown in Fig. 2, which, at its upper end, terminates in a threaded nipple 8 for extending through an opening in the upper end of the cylinder 1 to receive a conventional manually controlled discharge valve 9.

The mixing unit 7 is formed at the lower end as a sleeve extension 10 into which the upper open end of the pick-up tube 5 is removably threaded. The mixing unit 7 is interiorly formed to provide an upwardly flaring mixing chamber 11 which at the lower end, has a short passage 12 of uniform diameter. The passage 12 merges at its upper end with the conical passage 11 and open at its lower end to the upper end of the pick-up tube. It will be particularly noted that the interior diameter of the upper end of the pick-up tube is somewhat greater than the diameter of the uniform diameter section 12 of the mixing unit. The body of the mixing unit 7 is formed with one or a series of passages 13 leading through the bottom of the mixing unit and opening beyond the size of the extension 10. These passages 13 extend upwardly at an inward inclination and open into the lower end of the conical mixing chamber 11.

The pick-up tube is provided, immediately below its connection with the extension 10, with an extremely small opening 14 which, as a general rule, will approximate 1 mm. in diameter. This opening 14 will, of course, open into the vapor area 3 in the cylinder and, therefore, the chemical from the body 4, in moving up through the pick-up tube to the discharge valve 9, is met by a high velocity fine stream of vapor which is formed into the tube through the opening from the vapor area 3. When the chemical stream meets the vapor stream it is vaporized and forms a preliminary mixture with the vapor before it is introduced into the mixing chamber 11. It is then slightly restricted by the passage 12 to be fed into the mixing chamber 11 in uniform quantity to the extent of the proportions required to be introduced with the volatile vapor from the area 3 to produce the desired fuel mixture.

It will be apparent that due to the flow of vapor through the opening 14 and the compression caused by the restriction of flow in the entrance end of the mixing unit, the chemical vapor from the chemical 4 is completely vaporized and thoroughly mixed with the volatile vapor from the area 3 of the liquid fuel 2. Consequently, when all the gaseous vapor has been exhausted from the cylinder the chemicals are also completely used and thus the effectiveness in the fuel of these particular chemicals, and in selected uniform proportions, is provided in a simple and effective manner. As the chemical vapor passes through the pick-up tube into the mixing unit, it will, of course, be mixed with the direct flow of the vapor from the area 3 which is fed through the passage or passages 13. The size and number of the passages 13 is such as to supply the volatile vapor in a proportional relation to that of the vapor from the chemical 4. Due to the tapering of the chamber 11 the vapors are permitted to expand and become thoroughly mixed as a composite fuel for delivery, as a mixture, to the discharge valve 9.

The flow of vapor under pressure through the passage 13 creates an injectory effect on the chemical which is drawn through the tube 5 into the mixing unit 7 and, therefore, is rendered in a completely vaporized condition. The vapor of the volatile liquid and the vapor of the chemical are thus mixed and as the proportions of the respective vapors may be controlled by the relative sizes and number of the passages 13, by the inside diameter of the pick-up tube 5 with respect to the size of the opening 14, and by the diameter of the passage 12, it is apparent that mixing of the vapors may be carried out in substantially uniform proportions which may be accurately selected within a reasonable range.

It is to be noted that the delivery of the chemical is automatically resultant from the pressure flow of the vapor of the voltatile liquid. Thus, the only operation necessary to perfect the proportional delivery, and thorough mixing, is the operations of the discharge valve 9. The control is entirely beyond the manipulation of the operator, and thus, with the proportions determined for the selected chemicals, a constant, completely mixed, and properly proportioned mixture of the vapors of the volatile liquid and chemical is obtained without substantial variation until the contents of the cylinder is exhausted.

It has been found that the addition of the single small hole 14 in tube 5 has assisted in both vaporizing the chemicals and equalizing pressure drops.

The invention is important in providing for the use of desired chemical constituents of hydrocarbon chemicals heretofore practically impossible to produce in cylinder storage of the gas, owing, primarily, to the fact that the chemicals do not remain as a mixture with the volatile liquid in the cylinder.

The proportions within the range of percent of mixtures of vapors of the volatile liquid and the hydrocarbon chemicals are not effective unless the cylinder valve is opened sufficiently to provide enough pressure and volume to efficiently do the welding, cutting, heating and for other purposes in application to metals for which hydrogen and acetylene is now used.

A convenient working gauge pressure for efficient working of the mixture and for a proper mixing of the vapor of a volatile liquid and vapors of chemicals within the proportions and within the range of proportions required, must be a working pressure of not less than two pounds and not more than 30 lbs. per square inch at 60° F.

What I claim as new is:

1. A device for supplying a continuous stream of substantially constant composition from a mixture of fluids having widely different vapor pressures and, in their liquid phases, having widely different specific gravities from a storage tank in which the fluids are confined under pressure, said device comprising a mixing unit in the top of the tank and connected with a discharge, and a pick-up tube connected to said mixing unit and extending to the bottom of the tank, said pick-up tube being open at the bottom to draw liquid having a lower vapor pressure and higher specific gravity, said mixing unit having a mixing chamber with a passage in communication with the pick-up tube and with an inlet in communication with the storage tank to admit vapor of a fluid having a higher vapor pressure and lower specific gravity, said inlet being inclined upwardly and inwardly and opening into said mixing chamber adjacent to said passage to direct an injection of high pressure vapor into fluid of lower vapor pressure supplied from said pick-up tube.

2. A device for supplying a continuous stream of substantially constant composition from a mixture of fluids having widely different vapor pressures and, in their liquid phases, having widely different specific gravities from a tank in which the fluids are confined under pressure, said device comprising a mixing unit having a mixing chamber and being positioned in the top of the tank for connection at its top with a discharge, and a pick-up tube connected to the bottom of said mixing unit and having communication with the mixing chamber therein, said pick-up tube being open at the bottom to admit fluid of higher specific gravity and lower vapor pressure, said pick-up tube having a small inlet immediately below said mixing unit and that is open to said tank to admit an injectory stream of vapor of the fluid of higher vapor pressure and lower specific gravity to preliminarily mix with and promote vaporization of the liquid constituents of the fluid admitted up through said tube before said latter fluid is introduced into said mixing unit, said mixing chamber having a diameter greater than that of said pick-up tube to permit expansion and mixing of the vapors and an inlet in said unit and open to the tank to admit additional vapor of higher vapor pressure to be completely mixed with said preliminary mixture.

3. A device for supplying a continuous stream of substantially constant composition from a mixture of fluids having widely different vapor pressures and, in their liquid phases, having widely different specific gravities from a tank in which the fluids are confined under pressure, said device comprising a mixing unit positioned in the top of the tank for connection at its top with a discharge, and a pick-up tube connected to the bottom of said mixing unit and extending to the bottom of said tank, said pick-up tube being open at its bottom to admit fluid of higher specific gravity and lower vapor pressure, said pick-up tube having a small inlet immediately below its connection with said mixing unit, said tube inlet being open to the top area of said tank to admit an injectory stream of vapor of the fluid of higher vapor pressure to preliminarily mix with and promote vaporization of the liquid constituents of the lower vapor pressure fluid admitted up through said tube, said mixing unit having a mixing chamber and a passage in communication with said tube for admitting the preliminary mixture to said chamber, said mixing unit having an inlet opening in said chamber adjacent to said passage and open to the top area of said tank to admit an injectory stream of vapor of the fluid of higher vapor pressure for mixing with the preliminary mixture admitted through said passage, said mixing chamber having a greater diameter than that of the tube to permit thorough mixing and expansion to equalize the pressures of the vapors.

4. A device as defined in claim 3 wherein said mixing chamber is tapered outwardly from said passage to permit gradual expansion of said vapors.

5. A device as defined in claim 4 wherein said unit inlet opens into the small end of said chamber above said passage and is inclined toward the axis of said passage and chamber in the direction of flow from said passage to effect a thorough mixing of the vapors.

6. A device as defined in claim 3 wherein the inlet in the top of the pick-up tube is substantially 1 mm. in diameter.

7. In apparatus for supplying a continuous stream of substantially constant composition from a mixture of fluids having widely different vapor pressures and, in their liquid phases, having widely different specific gravities, the combination of a portable cylinder for containing the fluids under pressure, an opening in the top of said cylinder, a mixing unit in the top of said cylinder and having a portion extending outwardly through said opening, a dispensing valve secured beyond said cylinder to said outwardly extending portion, and a pick-up tube of uniform diameter connected to the bottom of said mixing unit and extending to the bottom of said cylinder, said tube being open at the bottom for admission of a stream of fluid from the lower portion of said cylinder which is of high specific gravity and has a low vapor pressure, a mixing chamber in said mixing unit, an outlet passage at the top of said mixing unit and extending from said chamber through said outwardly extending portion for communication with said valve, inlets at the bottom of said mixing unit and opening into said mixing chamber, one of said inlets being a passage in communication with said pick-up tube for admission to said chamber of the fluid of high specific gravity and low vapor pressure, another of said inlets being in communication directly with the upper portion of said cylinder for the admission of vapor of a fluid of low specific gravity and higher vapor pressure, a small inlet in the top of said tube immediately below the mixing unit and open to vapor of a low specific gravity fluid having a high vapor pressure, said opening being adapted to admit a fine stream of the vapor for preliminarily mixing with and promoting vaporization of the liquid constituents of the stream of fluid drawn up through said tube before it is admitted to said mixing unit, said mixing chamber being tapered outwardly from said passage to said tube to a diameter greater than that of the tube to permit expansion and equalization of pressures of the vapors, and said chamber inlet from said cylinder opening into said chamber immediately above said passage and being inclined to the axis of said chamber in the direction of flow from said passage to inject the high pressure vapor into said preliminary mixture and promote expansion and thorough mixing.

SAMUEL H. WHITE.

REFERENCES CITED

The following references are of record in the file of this patent:

UNITED STATES PATENTS

| Number | Name | Date |
| --- | --- | --- |
| 1,938,036 | Martin et al. | Dec. 5, 1933 |
| 2,390,871 | Conway | Dec. 11, 1945 |

FOREIGN PATENTS

| Number | Country | Date |
| --- | --- | --- |
| 628,195 | Germany | Mar. 30, 1936 |